United States Patent
Tayouo et al.

(10) Patent No.: US 9,138,691 B2
(45) Date of Patent: Sep. 22, 2015

(54) COPOLYMERS COMPRISING PHOSPHONATE AND/OR PHOSPHONIC ACID GROUPS, USABLE FOR FORMING FUEL CELL MEMBRANES

(75) Inventors: Russell Tayouo, Montpellier (FR); Ghislain David, Montpellier (FR); Bruno Ameduri, Montpellier (FR); Stéphanie Roualdes, St Clement De Riviere (FR); Hervé Galiano, La Ville Aux Dames (FR); Jannick Bigarre, Tours (FR)

(73) Assignees: COMMISSARIAT A L'ENERGIE ATOMIQUE ET AUX ENERGIES ALTERNATIVES, Paris (FR); CENTRE NATIONAL DE LA RECHERCHE SCIENTIFIQUE, Paris (FR)

(*) Notice: Subject to any disclaimer, the term of this patent is extended or adjusted under 35 U.S.C. 154(b) by 822 days.

(21) Appl. No.: 13/500,530
(22) PCT Filed: Oct. 19, 2010
(86) PCT No.: PCT/EP2010/065687
§ 371 (c)(1), (2), (4) Date: May 2, 2012
(87) PCT Pub. No.: WO2011/048076
PCT Pub. Date: Apr. 28, 2011

(65) Prior Publication Data
US 2012/0219878 A1    Aug. 30, 2012

(30) Foreign Application Priority Data
Oct. 22, 2009 (FR) .................. 09 57407

(51) Int. Cl.
*H01M 8/10* (2006.01)
*B01D 71/32* (2006.01)
(Continued)

(52) U.S. Cl.
CPC .............. *B01D 71/32* (2013.01); *B01D 71/82* (2013.01); *C08F 214/188* (2013.01);
(Continued)

(58) Field of Classification Search
CPC ...... H01M 8/10; H01M 8/1018; C08F 214/18; C08F 230/02; C08F 8/40; B01D 71/82
USPC ..................................... 429/492, 494
See application file for complete search history.

(56) References Cited

PUBLICATIONS

Valade, et al., "Synthesis and modification of alternating copolymers based on vinyl ethers, chlorotrifluoroethylene, and hexafluoropropylene" Macromolecules 20091027 American Chemical Society USA LNKD-D01: 10.1021/MA900860U, vol. 42, No. 20, Sep. 30, 2009, pp. 7689-7700, XP002586167.

(Continued)

*Primary Examiner* — Tracy Dove
(74) *Attorney, Agent, or Firm* — Knobbe, Martens, Olson & Bear, LLP

(57) ABSTRACT

Copolymers comprising at least one recurrent unit of the following formula (I) are provided:

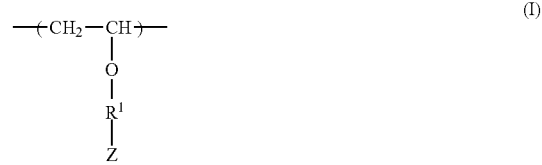

and at least one recurrent unit of the following formula (II):

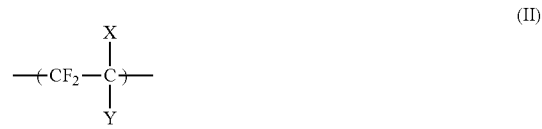

wherein:
$R^1$ is an alkylene group;
Z is a $-PO_3R_3R_4$, $R_3$ and $R_4$ representing independently of each other, a hydrogen atom an alkyl group, a cation;
X and Y represent, independently of each other, a halogen atom, a perfluorocarbon group.

12 Claims, 1 Drawing Sheet

(51) Int. Cl.
  *B01D 71/82* (2006.01)
  *C08F 214/18* (2006.01)
  *C08F 214/24* (2006.01)
  *C08F 230/02* (2006.01)
  *C08J 5/22* (2006.01)
  *C08F 216/14* (2006.01)
  *C08F 216/18* (2006.01)
  *B01D 71/44* (2006.01)

(52) U.S. Cl.
  CPC .......... *C08F 214/247* (2013.01); *C08F 230/02* (2013.01); *C08J 5/225* (2013.01); *H01M 8/1023* (2013.01); *H01M 8/1039* (2013.01); *H01M 8/1072* (2013.01); *B01D 71/44* (2013.01); *C08F 216/1408* (2013.01); *C08F 216/18* (2013.01); *C08F 2810/50* (2013.01); *C08J 2327/00* (2013.01); *H01M 2300/0082* (2013.01); *Y02E 60/523* (2013.01)

(56) References Cited

PUBLICATIONS

Yamabe, et al., "Novel phosphonated perfluorocarbon polymers" European Polymer Journal, Pergamon Press Ltd. Oxford, GB LNKD-DOI: 10.1016/S0014-3057 (99)00158-5, vol. 36, No. 5 May 1, 2000, pp. 1035-1041, XP004189905.
Schmidt-Naake, et al., "Synthesis of proton exchange membranes with pendent phosphonic acid groups by irradiation grafting of VBC" Chemical Engineering and Technology Jun. 2005 Wiley-VCH VERLAG DE LNKD-DOI:10.1002/CEAT.200407143, vol. 28, No. 6, Jun. 2005, pp. 720-724, XP002587039.
International Search Report and Written Opinion dated Dec. 7, 2010 for International Application No. PCT/EP2010/065687.
Kreuer, "On the development of proton conducting polymer membranes for hydrogen and methanol fuel cells", Journal of Membrane Science, 185 (2001) pp. 29-39.
Lafitte, et al., "Polysulfone Ionomers Functionalize with Benzoyl (difluoromethylenephosphonic acid) Side Chains for Proton-Conducting Fuel-Cell Membrane", Journal of Polymer Science: Part A: Polymer Chemistry, 2007, vol. 45, pp. 269-283.

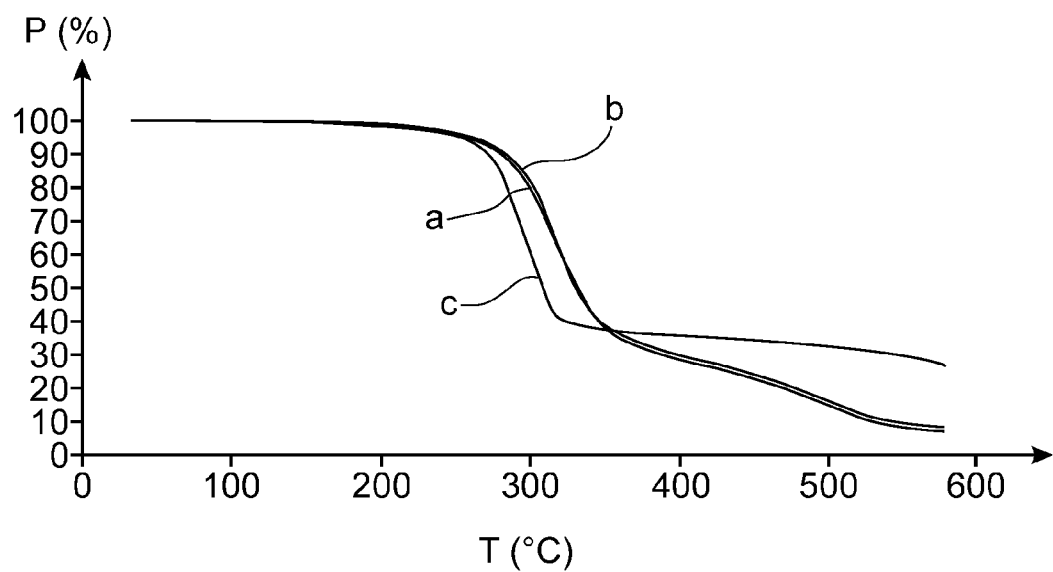

COPOLYMERS COMPRISING PHOSPHONATE AND/OR PHOSPHONIC ACID GROUPS, USABLE FOR FORMING FUEL CELL MEMBRANES

RELATED APPLICATIONS

This application is a U.S. National Phase of International Application No. PCT/EP2010/065687, filed Oct. 19, 2010, designating the U.S., and published in French as WO/2011/048076 on Apr. 28, 2011 which claims the benefit of French Patent Application No. 0957407 filed Oct. 22, 2009.

TECHNICAL FIELD

The present invention relates to original fluorinated copolymers comprising phosphonate and/or phosphonic acid groups (optionally as salts) as well as to their preparation method.

These copolymers having excellent physico-chemical capacities, in particular in terms of ion exchange capacities, of heat stability and chemical stability, may find their application in the preparation of ion exchange membranes, intended for fuel cells, in particular PEMFC (Proton Exchange Membrane Fuel Cell) and DMFC (meaning Direct Methanol Fuel Cell) fuel cells.

BACKGROUND

A fuel cell conventionally includes a stack of elementary cells, within which an electrochemical reaction occurs between two reagents which are introduced continuously. The fuel, such as hydrogen for fuel cells operating with hydrogen/oxygen mixtures (PEMFC) or methanol for fuel cells operating with methanol/oxygen mixtures (DMFC), is brought into contact with the anode, while the oxidizer, generally oxygen, is brought into contact with the cathode. The anode and the cathode are separated by an electrolyte, of the ion exchange membrane type. The electrochemical reaction, the energy of which is converted into electric energy, is split into two half-reactions:
  oxidation of the fuel, occurring at the anode/electrolyte interface producing in the case of hydrogen fuel cells, protons $H^+$, which will cross the electrolyte towards the cathode, and electrons which return to the outer circuit, in order to contribute to the production of electric energy;
  reduction of the oxidizer, occurring at the electrolyte/cathode interface with production of water in the case of hydrogen fuel cells.

The electrochemical reaction occurs at an electrode-membrane-electrode assembly.

The electrode-membrane-electrode assembly is a very thin assembly with a thickness of the order of one millimeter and each electrode is supplied with fuel and oxidizing gases for example by means of a splined plate, a so-called bipolar plate.

The ion conducting membrane is generally an organic membrane comprising ionic groups which, in the presence of water, allow conduction of the protons produced at the anode by oxidation of hydrogen.

More specifically, in an aqueous medium, the acid groups borne by the membranes totally dissociate and release free protons, which are surrounded with one or several water molecules, thereby ensuring transport of protons according to a carrier mechanism ensured by the hydration water. The mobility of the protons in the membrane is therefore closely related to the water content (i.e., in other words, to the swellability of the membrane) and to the conductivity of the membrane (related to the number of acid sites of the latter).

In addition to the capability of ensuring proton conduction, the membranes also have to meet the following specificities:
  low permeability to gases (notably to $H_2$ gas for PEMFC fuel cells and to methanol vapor for DMFC fuel cells, in order to ensure a good seal between the anode and cathode compartments of the cell as well as maximum electric and catalytic efficiency;
  sufficient absorption of water in order to promote a good swelling rate, in order to ensure good transport of protons from dissociation of acid protons, thereby forming a hydrated ionic phase in the totality of the volume of the membrane;
  good electrochemical and mechanical stability, notably reaction innocuousness toward reactive gases (such as hydrogen or methanol vapors) and resistance to gas pressures to which the cell is subject.

In order to attempt to overcome such requirements, the first polymers to have been elaborated are polymers having protogenic groups of the sulfonic acid type, more particularly sulfonic perfluorinated polymers such as Nafion®. These polymers have good proton transfer by a strong acidity related to the sulfonic acid groups and by a large hydration number $\lambda$ ($\lambda$>15, being defined as the number of water molecules per protogenic group). However, the membranes elaborated from these polymers only have actual effectiveness for large hydration levels and are thus limited to uses at low temperatures (i.e., temperatures below 90° C.) and with high relative humidity (for example of more than 80%).

Alternatives other than Nafion® have been proposed for forming membranes for fuel cells.

Thus, some authors have proposed membranes based on polymers comprising nitrogen-containing heterocyclic groups, these groups allowing proton conduction said to be by « proton jumps» between heterocyclic groups (as described in J. Membr. Sci. 2001, 185, 29-39).

In order to operate, these membranes do not absolutely require the presence of an aqueous solution. It should also be noted that proton dissociation of the aforementioned heterocyclic groups is very low (these groups having a pKa greater than that of water), which, for obtaining effective conductivity requires the adjunction in the membrane, in addition to the polymers, of one or several dopants forming an additional source for providing protons.

Other authors have proposed membranes based on polymers comprising protogenic groups of the phosphonic acid type with however the drawbacks inherent to these groups, i.e.:
  lower acidity of the phosphonic acid groups than that of sulfonic acid groups, which requires a level of presence of these groups in the polymers, greater than that of the sulfonic acid groups in order to obtain an equivalent conduction;
  difficulties for synthesizing this type of polymer.

These polymers bearing phosphonic acid groups may be obtained via two synthesis routes:
  either by polymerization of monomers bearing phosphonate groups followed by hydrolysis of the phosphonate groups into phosphonic acid groups;
  or by introducing phosphonate groups into existing polymers followed by hydrolysis of the phosphonate groups into phosphonic acid groups.

As regards the first route, it is not very used, since no suitable monomers comprising phosphonate groups exist on the market. In order to apply it, it is thus necessary to make said monomers often at the expense of several non-trivial synthesis steps, which may be expensive to apply because of the high cost of the reagents.

As regards the second route, copolymers were designed from base copolymers comprising aromatic groups. Thus, Laffite and Jannasch (J. Polym. Sci., Part A: Poly. Chem. 2007, 45, 269-283) designed copolymers bearing phosphonic groups starting with a base copolymer comprising aromatic groups bearing sulfone groups, and by subjecting it to a lithiation step and a phosphonation step by cross-coupling, the sulfone groups being thereby replaced with phosphonate groups followed by hydrolysis for transforming them into phosphonic groups. The synthesis of these copolymers however requires significant safety conditions because of the use of butyllithium. Furthermore, the resulting copolymers have a high glassy transition temperature, which makes it difficult to shape them into the form of membranes. Finally, these copolymers have a proton conductivity of about 5 mS/cm at 100° C. for relative humidities of less than 30% and with an ion exchange capacity ranging from 0.6 to 1.8 mequiv./g.

The inventors propose the development of novel copolymers which may be used for forming fuel cell membranes, which meet the following requirements:

adjustable proton conductivity, which may be high for temperatures ranging from room temperature up to 150° C. and for relative humidities of less than 50%;

thermal stability at high temperatures, for example ranging up to 150° C.;

facility of being shaped as a membrane, notably related to the ability of these copolymers of being solubilized in organic solvents, such as dimethylsulfoxide;

facilitated synthesis of these copolymers.

DESCRIPTION OF CERTAIN INVENTIVE ASPECTS

Copolymers meeting the specificities mentioned above are copolymers comprising at least one recurrent unit of the following formula (I):

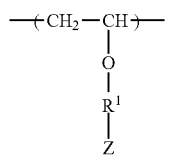

(I)
and at least one recurrent unit of the following formula (II):

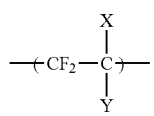

wherein:
  $R^1$ is an alkylene group;
  Z is a —$PO_3R_3R_4$ group, $R_3$ and $R_4$ representing independently of each other a hydrogen atom, an alkyl group or a cation;
  X and Y represent independently of each other, a halogen atom or a perfluorocarbon group.

Before going into more detail in the description, we propose the following definitions.

By perfluorocarbon group is conventionally meant in the foregoing and in the following, a group exclusively comprising carbon atoms and fluorine atoms. For example, this may be a perfluoralkyl group, comprising from 1 to 6 carbon atoms, such as a perfluoromethyl group —$CF_3$.

By an alkylene group is meant an alkyl group forming a bridge between two other groups, for example, comprising from 1 to 10 carbon atoms, such as an ethylene group —$CH_2$—$CH_2$—.

According to the invention, $R^1$ may be a —$CH_2$—$CH_2$— group.

According to the invention, X and Y may each represent a halogen atom, such as fluorine and chlorine, at least one of the groups X or Y preferably being a fluorine atom or X may represent a perfluoroalkyl group, such as —$CF_3$ while Y represents a halogen atom such as F.

The copolymers of the invention may comprise from 40 to 80% by moles of a recurrent unit of formula (I) and from 20 to 60% by moles of a recurrent unit of formula (II).

The number molar mass of the copolymers of the invention may range from 20,000 to 30,000 g./mol$^{-1}$.

In addition to the aforementioned recurrent units of formula (I) and (II), the copolymers may comprise at least one recurrent unit of the following formula (III):

wherein $R^2$ is an alkyl group which may comprise from 1 to 10 carbon atoms, such as an ethyl group —$CH_2$—$CH_3$.

In this case, the copolymers may comprise from 10 to 40% by moles of a recurrent unit of formula (I), from 40 to 80% by moles of a recurrent unit of formula (II) and from 0 to 30% by moles of a recurrent unit of formula (III).

From a structural point of view, the copolymers of the invention may be random copolymers (which means that the aforementioned recurrent units are randomly distributed in the backbone of the copolymer), alternating copolymers (which means that there is an alternation between a recurrent unit of formula (I) and a recurrent unit of formula (II) and optionally a recurrent unit of formula (III).

Among the copolymers according to the present invention, mention may be made of the following particular copolymers;

copolymers comprising as a recurrent unit according to formula (I) a recurrent unit of the following formula (Ia):

Z being a group of formula —$PO_3R_3R_4$, with $R_3$ and $R_4$ representing an ethyl group —$CH_2$—$CH_3$ or a hydrogen atom, and as a unit according to formula (II), a recurrent unit of the following formula (IIa):

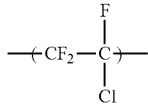 (IIa)

copolymers comprising as a recurrent unit according to formula (1) a recurrent unit of the following formula (Ia):

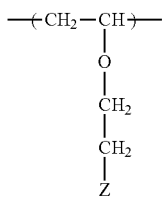 (Ia)

Z being a group of formula —PO$_3$R$_3$R$_4$, with R$_3$ and R$_4$ representing an ethyl group —CH$_2$—CH$_3$ or a hydrogen atom, and as a unit according to formula (II) a recurrent unit of the following formula (IIa):

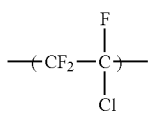 (IIa)

and as a unit according to formula (III) a recurrent unit of the following formula (IIIa):

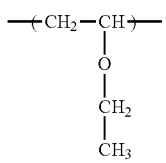 (IIIa)

The copolymers of the invention may be prepared by a simple application method comprising:
  a step for reacting a base copolymer comprising at least one recurrent unit of the following formula (IV):

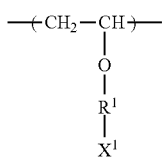 (IV)

and at least one recurrent unit of the following formula (II):

 (II)

wherein R$^1$, X and Y are as defined above and X$^1$ is an iodine atom,
and optionally a recurrent unit of the following formula (III):

 (III)

wherein R$^2$ is as defined above,
  with a trialkylphosphite reagent, whereby all or part of the groups X$^1$ are substituted with a group of formula —PO$_3$R$_5$R$_6$, R$_5$ and R$_6$ representing an alkyl group from the trialkylphosphite reagent;
    optionally, a step for hydrolysis of the —PO$_3$R$_5$R$_6$ group, whereby said group is transformed into a —PO$_3$R$_3$R$_4$ group, with R$_3$ and R$_4$ representing a hydrogen atom or a cation.
  The trialkylphosphite reagent may fit the formula P(OR$_5$)(OR$_6$)(OR$_7$), R$_5$, R$_6$ and R$_7$ representing an alkyl group, such as an ethyl group.
  When the intention is to obtain copolymers for which R$_3$ and R$_4$ are alkyl groups, there is no necessary hydrolysis step as the one mentioned above, considering that the constitutive alkyl groups of R$_3$ and R$_4$ are nonetheless only groups R$_5$ and R$_6$ stemming from the trialkylphosphite reagent.
  The step for substituting an iodine atom with a phosphonate group is known as the Arbuzov reaction, which consists in a nucleophilic substitution reaction of the SN$_2$ type according to the following reaction scheme:

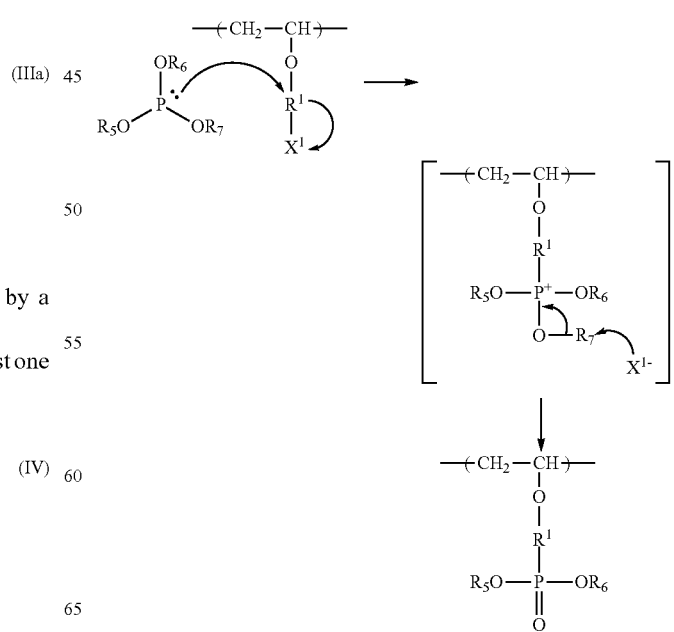

This reaction is conducted by heating the reaction medium, for example, to a temperature ranging from 80 to 130° C., such as 120° C.

The resulting copolymer may then undergo an isolation step by precipitation, for example with distilled water and then be subject to a drying step.

The resulting copolymer of the Arbuzov reaction and after optional isolation and optional drying may be subject to a hydrolysis step so as to transform the phosphonate group —PO$_3$R$_5$R$_6$ into a phosphonic acid group or a salt thereof, this hydrolysis step being ensured at room temperature by putting the copolymer first in contact with a silylation agent, such as bromotrimethylsilane, followed, secondly, by putting the silylated copolymer in contact with an alcoholic medium, such as methanol, whereby phosphonic acid groups are obtained, optionally as a salt.

The aforementioned base copolymer may result from an iodination reaction of a copolymer comprising at least one recurrent unit of formula (V):

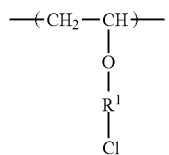

(V)

and at least one recurrent unit of the following formula (II):

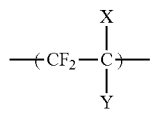

(II)

wherein R$^1$, X and Y are as defined above and optionally at least one recurrent unit of formula (III):

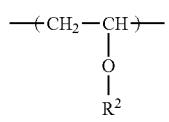

(III)

wherein R$^2$ is as defined above,
with an iodination reagent, such as an iodine salt like sodium iodide.

The copolymer comprising at least one recurrent unit of formula (V) and at least one recurrent unit of formula (II) and optionally at least one recurrent unit of formula (III) may be made by a copolymerization method, in particular, a radical copolymerization method comprising a step for polymerization in the presence of a free radical initiator, of at least one monomer of the following formula (VI):

(VI)

of at least one monomer of the following formula (VII):

(VII)

and optionally of at least one monomer of the following formula (VIII):

(VIII)

R$^1$, X, Y and R$^2$ are as defined above.

An efficient initiator of free radicals within the scope of this method may be selected from perpivalate derivatives, such as tertiobutyl perpivalate.

The polymerization step is advantageously carried out in an aprotic polar solvent, which may be selected from the following solvents:
dimethylformamide (DMF);
acetonitrile;
a halogenated solvent, such as 1,1,2-trifluoro-1,2,2-trichloroethane, 1,1,1,3,3-pentafluorobutane;
tetrahydrofurane;
water, and
mixtures thereof.

In the case when the monomers used exist as a gas (this is notably the case of the chlorotrifluoroethylene monomer) and when the reaction takes place under pressure, the latter may be applied in an autoclave.

The method of the invention is particularly advantageous, since it allows control of the substitution level of the base copolymer with phosphonate and/or phosphonic acid groups (optionally as salts) by acting on the amount of units of formula (IV) present in the base copolymer. Further, this method is easy to apply.

The copolymers according to the invention, as mentioned earlier, have the particularity of having good chemical and mechanical stability notably at temperatures above 100° C., or even ranging up to 250° C. and this regardless of the phosphonic group level.

Consequently, the object of the present invention is also a membrane comprising at least one copolymer as described above.

The membranes may be prepared in a conventional way, for example by casting, i.e. the copolymer is put into solution in an adequate solvent, such as acetone, and then applied on a planar surface, for example a glass plate, with a device, such as a hand applicator.

The copolymer forming a humid film is then dried in order to form a film with adequate thickness, for example from 15 to 150 μm, and then detached from the substrate.

Such membranes comprising phosphonic acid groups may have a very high ion exchange capacity, which may range up to 6 mequiv.g$^{-1}$. Consequently, these membranes may notably be used for isolating the anode and cathode compartments of a fuel cell which may operate with the following systems:
hydrogen, alcohols, such as methanol at the anode;
oxygen, air at the cathode.

Thus, the object of the present invention is a fuel cell device comprising at least one electrochemical cell comprising a membrane as defined above, which membrane is positioned between two electrodes.

In order to prepare such a device, the membrane is placed between two electrodes, for example in carbon fabric, optionally platinum-plated, and impregnated for example with a copolymer according to the invention. The assembly is then pressed with heating.

This assembly is then inserted between two plates (for example in graphite, called bipolar plates, which ensure distribution of the gases and electric conductivity).

The invention will now be described, with reference to the following examples given as an indication and not as a limitation.

BRIEF DESCRIPTION OF THE DRAWINGS

The single FIGURE represents a graph illustrating the mass loss P (in %) of the copolymers prepared in Example 1, Example 2 and Example 3 (curves a, b and c respectively) versus the applied temperature T (in ° C.).

DETAILED DISCUSSION OF CERTAIN ILLUSTRATIVE EMBODIMENTS

Example 1

This example comprises three steps:
- a step for synthesizing a copolymer by copolymerization of chlorotrifluoroethylene and of 2-chloroethylvinylether;
- a step for iodination of the obtained copolymer;
- a step for an Arbuzov reaction of the iodinated copolymer;
- a step for hydrolysis of the phosphonate groups of the copolymer.

a) Step for Synthesizing a Copolymer by Copolymerization of Chlorotrifluoroethylene and of 2-Chloroethylvinylether The monomers used within the scope of this step are respectively:

chlorotrifluoroethylene of the following formula:

entitled CTFE in the following:

2-chloroethylvinylether of the following formula:

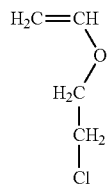

entitled CEVE in the following.

CTFE appears in gaseous form, which requires the use of an autoclave in order to apply this step.

The autoclave is provided with a mechanical stirrer, with two valves (an inlet valve and a gas outlet valve), a safety disc and a precision pressure gauge.

In a first phase, $K_2CO_3$ is introduced into the autoclave as a powder in an amount of 3% by moles based on CEVE followed by pressurization of the autoclave with nitrogen at 25 bars for about 60 mins. Once the nitrogen is discharged, the reactor is placed in vacuo for about 30 minutes, and then CEVE (20 g), tertiobutyl perpivilate (1.03 g) (in an amount of 1% by moles based on CEVE), 1,1,1,3,3-pentafluorobutane (150 mL) and the CTFE (24 g) are introduced therein.

The autoclave is then placed with stirring and gradually heated up to 75° C. for about 15 hours. The product of this reaction is dissolved in diethylether and then precipitated from methanol and placed in vacuo at 50° C. with view to drying.

The yield of the reaction is 75%.

The structure of the copolymer is controlled by infrared spectroscopy, ($^1$H and $^{19}$F) NMR, gas chromatography (entitled GPC in the following), differential scanning calorimetry (entitled DSC in the following), thermogravimetric analysis (entitled TGA in the following) and by elementary analysis.

b) Iodination of the Copolymer Obtained in Step a)

The copolymer obtained in step a) is solubilized in the acetone contained in a 1,000 mL flask provided with a magnetic stirrer. Next, three equivalents of sodium iodide are introduced into the flask which is placed in an oil bath, on a heating stirrer and provided with a condenser. The reaction mixture of the flask is refluxed for 7 days. The iodinated copolymer is then filtered off and the filtrate is precipitated from methanol and placed in a vacuum oven at 50° C. The overall yield of the reaction is 68%. The structure of the iodinated copolymer is controlled by infrared spectroscopy, ($^1$H and $^{19}$F) NMR, GPC, DSC, TGA and by elementary analysis.

c) Arbuzov Reaction on the Iodinated Copolymer

In a 250 mL one-neck flask provided with a magnetic stirrer, 20 g of iodinated copolymer and 100 mL of triethylphosphite are successively introduced which are then immersed in an oil bath on a heating stirrer. The bath is heated to 120° C. for 24 hours. The phosphonated copolymer precipitates from 2,000 mL of distilled water. The product obtained after filtration is placed in a vacuum oven at 90° C. The overall yield of the reaction is 60%. The structure of the obtained copolymer is controlled by infrared spectroscopy, ($^1$H and $^{19}$F) NMR, GPC, DSC, TGA and by elementary analysis.

d) Hydrolysis of Phosphonate Groups Borne by the Copolymer Obtained in Step c)

In a 250 mL two-neck flask, equipped with a condenser and a magnetic stirrer, one molar equivalent of the copolymer obtained in step c) (15 g) bearing phosphonate groups is introduced into anhydrous dichloromethane under an inert atmosphere. After azeotropic distillation for 30 minutes with reflux, 2.2 molar equivalents of bromotrimethylsilane (12 mL) are introduced dropwise and with a syringe. The reaction mixture is left with stirring at 40° C. for 24 hours under an inert atmosphere. At the end of the silylation, the solvent is evaporated in vacuo. Next, the product is put into the presence of 30 mL of methanol and left with stirring for 4 hours. After removal of the methanol in vacuo, the copolymer bearing phosphonic acid groups is collected by precipitation from distilled water followed by drying in the oven (90° C./27 mbars), the overall yield of the reaction is 52%. The structure of the phosphonic acid functionalized copolymer is controlled by infrared spectroscopy, ($^1$H and $^{19}$F) NMR, GPC, DSC, TGA and by elementary analysis. The obtained copolymer has excellent solubility in dimethylsulfoxide. The solubility of the copolymer is one of the sought fundamental properties, since it allows the copolymer to be applied as membranes.

Example 2

The operating method for obtaining the copolymers of this example remains similar to the one followed in Example 1, except that a third monomer is added: the ethylvinyl ether of the following formula:

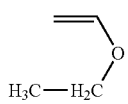

entitled EVE in the following.

In order to obtain a substitution level of 57%, molar proportions (CTFE)/(CEVE)/(EVE): 50/30/20 are used.

The structure of the copolymer comprising phosphonic acid groups is controlled by infrared spectroscopy, ($^1$H and $^{19}$F) NMR, GPC, DSC, TGA and by elementary analysis. The copolymer obtained has excellent solubility in dimethylsulfoxide. The solubility of the copolymer is one of the sought fundamental properties, since it allows the copolymer to be applied as membranes.

Example 3

The operating method for obtaining the copolymers of this example remains similar to the one followed in Example 1, except that a third monomer is added: the ethylvinyl ether of the following formula:

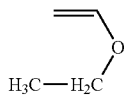

entitled EVE in the following.

In order to obtain a substitution level of 35%, molar proportions (CTFE)/(CEVE)/(EVE): 50/20/30 are used.

The structure of the copolymer comprising phosphonic acid groups is controlled by infrared spectroscopy, ($^1$H and $^{19}$F) NMR, GPC, DSC, TGA and by elementary analysis. The copolymer obtained has excellent solubility in dimethylsulfoxide. The solubility of the copolymer is one of the sought fundamental properties, since it allows the copolymers to be applied as membranes.

Example 4

This example illustrates the heat stability of the copolymers shown according to Examples 1 to 3 above.

The heat stability was evaluated with thermogravimetric analyses with a TGA 51 apparatus from TA Instruments. The mass samples comprised between 2 and 10 mg (more specifically 5 mg) are heated from 20 to 600° C. (with a rise in temperature of 5° C./min) in air and with a preliminary isotherm at 100° C. for 30 minutes.

The results of these analyses are copied onto the single FIGURE illustrating the mass loss (in %) versus temperature (in ° C.).

For the three copolymers prepared according to Examples 1-3 (the behavior of which is illustrated by the curves a), b) and c) of FIG. 1, respectively), heat stability is observed up to 250° C. Beyond this temperature, the copolymers begin to decompose.

From these results, it emerges that the copolymers of the invention may be used at high temperatures, notably in fuel cells for which the temperature of use may range up to 150° C.

Example 5

This example illustrates the shaping of the copolymers prepared according to Examples 1 to 3 as membranes.

To do this, in a first phase, it is proceeded with dispersion of the copolymer in an organic solvent: dimethylsulfoxide (DMSO), the solvent representing 73% by mass based on the mass of the copolymer. More specifically, the copolymer is introduced into the solvent and then the whole is stirred for at least two hours until complete dissolution of the copolymer. The obtained solution is then subject to an ultrasonic bath for several minutes.

In a second phase, the obtained viscous mixture is deposited on a Teflon plate by means of a hand applicator (hand-coater) placed under a hood with laminar flow. Next, slow evaporation of the solvent is ensured by placing the Teflon plate in an oven, the temperature of which is set to 60° C. for 1 hour, and then 70° C. for 1 hour and finally 90° C. for 12 hours.

The obtained membranes from the copolymers of Example 1, Example 2 and Example 3 have a thickness of 60, 150 and 100 μm and an experimental ion exchange capacity of 5.76, 2.09 and 0.75 mequiv./g, respectively.

This experimental ion exchange capacity (entitled $IEC_{exp}$ in the following) is determined by a return assay of phosphonic acid groups in the copolymer by following the procedure below:

Wiping the faces of the membrane sample with filter paper;
Immersing it twice in a 1M HCL solution (in an amount of 50 mL every time for a 2 cm$^2$ membrane);
Successive rinsings with distilled water (3 times);
Immersing it in a solution containing 5 mL of 0.1N NaOH and 50 mL of 0.1N NaCl (this solution forming the exchange solution), in order to promote exchange between H$^+$ and Na$^+$ with low stirring for 4 hours;
Assaying the OH$^-$ anions of the exchange solution with a 10$^{-2}$ M HCl solution (a so-called titrating solution).

The volume of the exchange solution has to be measured accurately. The experimental IEC (in mequiv.g$^{-1}$) is then calculated by the following equation:

$$IEC_{exp} = [OH^-] * V/m_s$$

wherein:
[OH$^-$]=Concentration of the OH$^-$ exchange solution (mol/L);
V=Volume of the exchange solution (in mL);
$m_s$=dry mass of the sample (in g) as determined by weighing in a halogen moisture analyzer HR53 (Mettler Toledo).

Example 6

This example illustrates the electrochemical results obtained from membranes prepared according to Example 5, in particular in terms of proton conductivity.

The measurements of proton conductivity are determined by complex impedance spectroscopy by using an acquisition bench, formed with a frequency analyzer (Solartron SI 1255) coupled with a measurement cell provided with two platinum electrodes with an active surface area of 0.785 cm$^2$. The measurements are conducted in a weathering enclosure, in order to set the humidity rate and the temperature during the test.

The proton conductivity measurements at room temperature (with relative humidity close to 100%) lead to values of about 20 mS/cm.

What is claimed is:

1. A copolymer comprising at least one recurrent unit of the following formula (I):

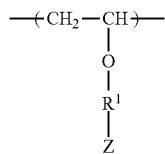
(I)

and at least one recurrent unit of the following formula (II):

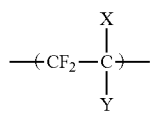
(II)

wherein:
R² is an alkylene group;
Z is a —PO₃R₃R₄, R₃ and R₄ representing independently of each other, a hydrogen atom, an alkyl group or a cation;
X and Y represent independently of each other a halogen atom or a perfluorocarbon group.

2. The copolymer according to claim 1, wherein R¹ is a group of formula —CH₂—CH₂—.

3. The copolymer according to claim 1, wherein X and Y each represent a halogen atom, at least one of the groups X or Y being a fluorine atom.

4. The copolymer according to claim 1, wherein X represents a perfluoroalkyl group, while Y represents a halogen atom.

5. The copolymer according to claim 1, further comprising at least one recurrent unit of the following formula (III):

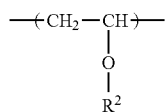
(III)

wherein R² is an alkyl group.

6. The copolymer according to claim 1, selected from the following copolymers:
copolymers comprising as a recurrent unit according to formula (I), a recurrent unit of the following formula (Ia):

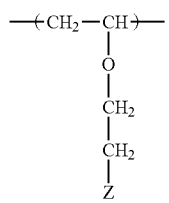
(Ia)

Z being a group of formula —PO₃R₃R₄, with R₃ and R₄ representing an ethyl group —CH₂—CH₃ or a hydrogen atom, and as a unit according to formula (II), a recurrent unit of the following formula (IIa):

(IIa)

or copolymers comprising as a recurrent unit according to formula (I), a recurrent unit of the following formula (Ia):

(Ia)

Z being a group of formula —PO₃R₃R₄, with R₃ and R₄ representing an ethyl group —CH₂—CH₃ or a hydrogen atom, and as a unit according to formula (II), a recurrent unit of the following formula (IIa):

(IIa)

and as a unit according to formula (III), a recurrent unit of the following formula (IIIa):

(IIIa)

7. A method for preparing a copolymer comprising at least one recurrent unit of the following formula (I):

(I)

and at least one recurrent unit of the following formula (II):

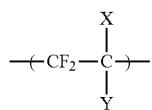
(II)

wherein:

$R^1$ is an alkylene group;

Z is a $-PO_3R_3R_4$, $R_3$ and $R_4$ representing, independently of each other, a hydrogen atom, an alkyl group or, a cation;

X and Y represent, independently of each other, a halogen atom or, a perfluorocarbon group, the method comprising:

reacting a base copolymer comprising at least one recurrent unit of the following formula (IV):

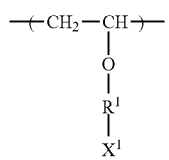
(IV)

and at least one recurrent unit of the following formula (II):

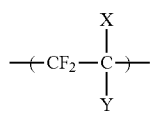
(II)

wherein $R^1$, X and Y are as defined above and $X^1$ is a iodine atom, with a trialkylphosphite reagent, whereby all or part of the $X^1$ groups are substituted with a group of formula $-PO_3R_5R_6$, $R_5$ and $R_6$ representing an alkyl group derived from the trialkylphosphite reagent.

8. The method according to claim 7, wherein the trialkylphosphite reagent fits the formula $P(OR_5)(OR_6)(OR_7)$, $R_5$, $R_6$ and $R_7$ representing an alkyl group.

9. The method according to claim 7, wherein the base copolymer results from a reaction for iodination of a copolymer comprising at least one recurrent unit of formula (V):

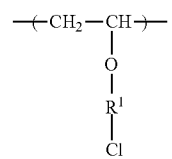
(V)

and at least one recurrent unit of the following formula (II):

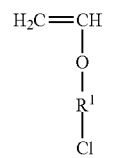
(II)

wherein $R^1$, X and Y are as defined in claim 7;

with an iodination reagent.

10. The method according to claim 9, wherein the copolymer comprising at least one recurrent unit of formula (V), at least one recurrent unit of formula (II) is obtained with a copolymerization method comprising:

polymerizing in the presence of an initiator of free radicals at least one monomer of the following formula (VI):

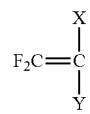
(VI)

of at least one monomer of the following formula (VII):

(VII)
$$F_2C=\underset{\underset{Y}{|}}{\overset{\overset{X}{|}}{C}}$$

wherein:

R1 is an alkylene group;

X and Y represent, independently of each other, a halogen atom or a perfluorocarbon group.

11. A membrane comprising at least one copolymer as defined according to 1.

12. A fuel cell device comprising at least one electrochemical cell comprising a membrane as defined in claim 11, which membrane is positioned between two electrodes.

* * * * *